United States Patent
Bhagat et al.

(10) Patent No.: US 6,591,315 B1
(45) Date of Patent: Jul. 8, 2003

(54) REMOTE INTELLIGENT PERIPHERAL ROUTING METHOD AND APPARATUS

(75) Inventors: Promod Kumar Bhagat, Morganville, NJ (US); Wesley A. Brush, Brick, NJ (US); Mayra F. Caceres, Freehold, NJ (US); James M. Carnazza, Rumson, NJ (US); Jiayu Chen, Morganville, NJ (US); Edite M. Hanlon, Freehold, NJ (US); Patricia S. Marchiano, Westfield, NJ (US); Gary A. Munson, Little Silver, NJ (US); Alfred Nater, Flemington, NJ (US); Dominic M. Ricciardi, Bridgewater, NJ (US); Chia-Fang Shih, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/574,278

(22) Filed: May 19, 2000

(51) Int. Cl.⁷ .................................................. G06F 3/00
(52) U.S. Cl. ........................ 710/38; 710/15; 709/239; 379/221.09; 379/221.11; 379/221.12
(58) Field of Search ............................ 710/3–5, 15, 17, 710/20, 33, 36–38, 118; 709/204–207, 217–219, 238–242

(56) References Cited

U.S. PATENT DOCUMENTS

| | | | |
|---|---|---|---|
| 6,018,567 A | * | 1/2000 | Dulman ...................... 379/120 |
| 6,061,729 A | * | 5/2000 | Nightingale ................. 709/203 |
| 6,128,379 A | * | 10/2000 | Smyk .......................... 370/353 |
| 6,330,598 B1 | * | 12/2001 | Beckwith et al. ........... 709/223 |
| 6,332,022 B1 | * | 12/2001 | Martinez ................ 379/201.01 |
| 6,453,035 B1 | * | 9/2002 | Psarras et al. ......... 379/220.01 |

* cited by examiner

*Primary Examiner*—Jeffrey Gaffin
*Assistant Examiner*—Eron Sorrell

(57) ABSTRACT

This invention provides a telecommunications routing system and method that allows a switch (e.g., an intelligent peripheral) to control the routing to a special applications device, which results in savings of time, cost and capacity throughout the entire network. Control of the routing lies within the Service Switching Point (SSP) which reduces the need to requery a Service Control Point (SCP) in error situations. This invention incorporates into the SSP a remote IP routing table containing routing instructions for IPs. The SSP will know if an alternate route is possible, based on the error from the IP. The SSP will have a rudimentary intelligence about routing which allows it to reroute when necessary, without requerying back to the SCP. The remote IP routing table will also allow the SSP to route to a successive IP if the local IP, although operative, cannot process the request.

17 Claims, 3 Drawing Sheets

REMOTE INTELLIGENT PERIPHERAL ROUTING METHOD AND APPARATUS

BACKGROUND OF THE INVENTION

1. Field of Invention

This invention relates to a method and apparatus for allowing a service switching point (SSP) to route to a remote Intelligent Peripheral (IP) without the need to requery a service control point (SCP).

2. Description of Related Art

Currently, under Advanced Intelligent Network (AIN) requirements, calls are routed to IPs at the behest of the service control point (SCP) when speech services are needed for service processing. These speech services include playing announcements and collecting digits from a calling/called party. The SSP routes the appropriate message to the IP to set up the call. If the IP returns an error, the SSP will not have knowledge of the type of error. The error type is passed transparently to the SCP and the SCP must again determine the remote IP criteria. Thus, the SSP will requery the SCP every time the SSP attempts to route to an IP and the attempt fails. The querying and requerying is very costly in time, i.e., post dial delay, and message traffic to the entire network.

SUMMARY OF THE INVENTION

This invention provides for an IP routing system and method that allows a switch to control the routing to a special applications device which results in savings of time, cost and capacity throughout the entire network. Control of the routing lies within the switch, thus reducing the need to requery a controller in error situations. For example, the switch will know if an alternate route to a special applications device is possible if an error message is received from the special applications device without requerying to the controller. For the sake of illustration, the switch can be an originating SSP, the controller a SCP, and the special applications device can be an IP.

As one example, when the originating SSP receives a call, a trigger is activated. Based on the trigger, the originating SSP sends a message to the SCP. The SCP receives the message from the SSP and determines which service is appropriate for the call. If it is determined, for example, that an announcement is to be played and digits are to be collected from a caller, the SCP will send a message back to the originating SSP. The message sent to the originating SSP includes a destination address that enables the originating SSP to route the call to an IP. Routing to a remote IP is a scheme used by the originating SSP to access remote IP capabilities that are not otherwise available at the originating SSP at which the call originated.

The originating SSP receives the message from the SCP and extracts the destination address and determines if the address represents a locally connected IP or if the originating SSP has to route through the network to the IP. If it is a locally connected IP, the SSP then sends a message to the local IP for the purpose of setting up a connection and for delivering call control information. At this point there are two error possibilities. The originating SSP could find that it cannot route to the local IP due to the connection not being available to the local IP or the local IP cannot process the request. Ordinarily, if an error occurred, conventional SSPs would return a message to the SCP; and based on the type of error reported, the service processing at the SCP would make a decision to either clear the call or request another IP. However, the present invention allows the SSP to make a decision, without requerying to the SCP, to either clear the call or request another IP.

Thus, when the SCP requests the SSP to route to an IP, the SCP can send the appropriate destination address to the SSP so that the SSP would have access to several routes in a Remote IP Routing Table. The first route can be to a local IP. When the SSP attempts to utilize this first route and it fails, the SSP can automatically access the second route in the table without requerying the SCP. If the second route fails, the SSP can try the third route and so on. This reduces substantial post dial delay, saves SSP and SCP capacity, and cuts down on network traffic by not having to requery the SCP for each route failure. Thus, the SSP may actually get the opportunity to try a third or fourth route whereas, under conventional AIN processing, the second route might be the last route practical due to post dial delay.

These and other aspects of the invention will be apparent or obvious from the following description.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

The invention is described below in connection with a telecommunication system. That is, as described below, callers make telephone calls to request communication services and communicate with a desired called party or receive an appropriate announcement. However, it will be appreciated that the invention can be used with other types of communication systems, including wired and wireless communication systems, computer, cable or other similar networks that route information or that can route information through multiple different pathways.

Likewise, the term caller refers to any person or entity, such as a group of individuals or a computer, facsimile machine or other device that requests and receives communication services. Thus, the term caller is not restricted to including only human callers in a telecommunications network. The term called party is used in this description to refer to any person, entity, communication device or other communication destination. That is, the invention is not solely directed to routing telecommunications information between human communication device users. The term call is used to refer to any type of communications between a caller and a called party, not just telephone calls. Thus, a caller can "call" a called party over a telecommunication network, a computer network, or other communication system. Calls can also include both one- and two-way communication between a caller and a called party. Additionally, the term SSP can refer to any switch, SCP can refer to any controller, and IP can refer to any special applications device within a communication system.

Figure 1:
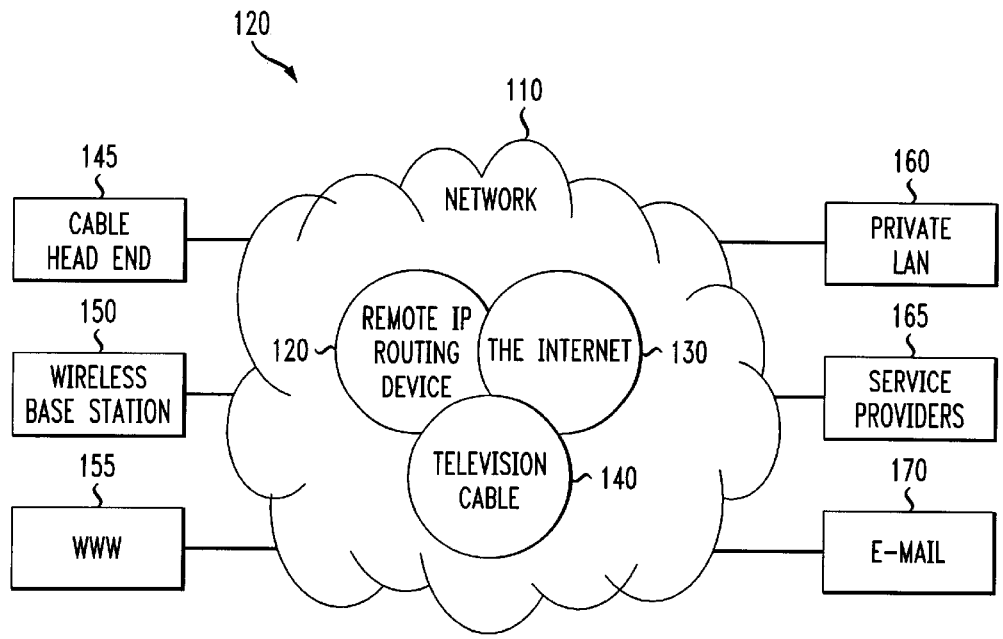
FIG. 1 illustrates an exemplary diagram of a remote IP routing system.

FIG. 1 shows an exemplary block diagram of a communications system 100 including a remote IP routing device 120. The communications system 100 includes, for example, a network 110 that includes the Internet 130, television cable 140, and the remote IP routing device 120. The network 110 is coupled to a cable head end 145, an e-mail server 170, a wireless base station 150, the World-Wide Web (WWW) 155, private LAN 160, and service providers 165. The cable head end 145, e-mail server 170, portable communication devices via the wireless base station 150, the World-Wide Web (WWW) 155, private LAN 160, and service providers 165 may be connected to various communication devices (not shown), such as terminals, servers, telephone stations, personal computers, televisions, portable communication devices, etc.

The network 110 may also include a telephone network (e.g., local and/or long distance), data networks, cable/TV networks, the Internet, intranets, or other wired or wireless networks either private or public or combinations of various networks.

A subscriber to the communication system 100 may have subscribed to many services. For example, the subscriber may have subscribed to a wireless telephone service, a pager service, an Internet service that receives e-mails from the e-mail server 170, and other types of services.

As discussed above, a user of the communication system 100 has a reduced need for communication between a service switching point (SSP), e.g., a telecommunication switch in network 110, and a Service Control Point (SCP), e.g., a device that actually performs the service processing, upon the inability of an Intelligent Peripheral (IP), e.g., a network 110 device that provides speech resources to the SSP via circuit or packet connections, to respond to a requested operation. This is because each SSP can contain a remote IP routing table containing routing instructions for IP.

Figure 2:
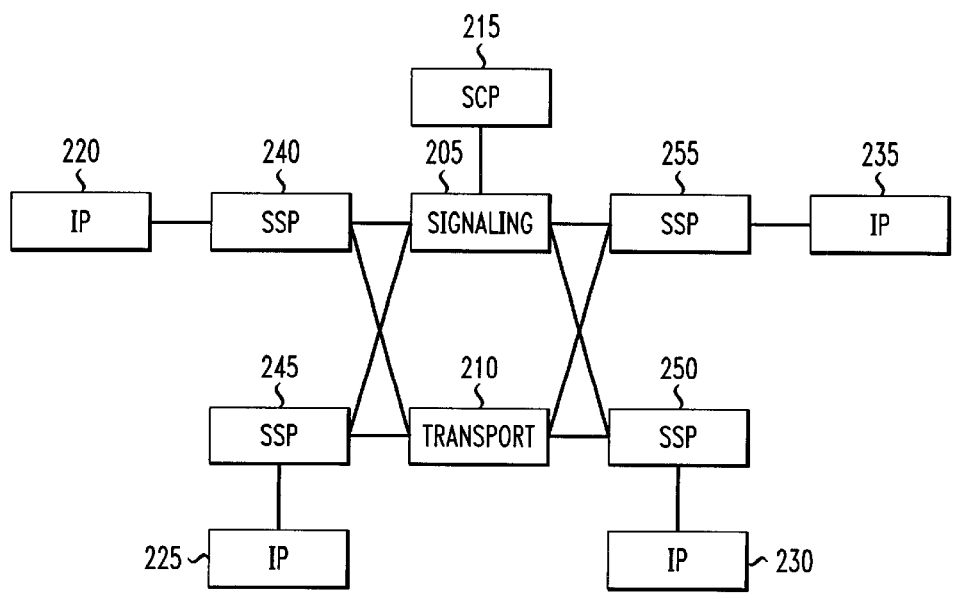
FIG. 2 illustrates an exemplary block diagram for a remote IP routing device.

FIG. 2 shows an exemplary block diagram for a remote IP routing device 120. The remote IP routing device 120 includes SSPs 240, 245, 250, and 255 (i.e., switches), a service control point (SCP) 215 (i.e., a controller), signaling 205, transport 210, and IPs 220, 225, 230 and 235. While FIG. 2 shows the SCP 215 and the SSPs 240, 245, 250 and 255 as separate units, the functions performed by these units may be combined or may be further divided among specified processors such as digital signal processors and/or performed by dedicated hardware such as application specific integrated circuits (ASIC) or other hardware implementations, such as PLDs, PALs or PLAs, for example.

The SSPs 240, 245, 250 and 255 in FIG. 2 are responsible for routing to an IP 220, 225, 230 and 235 without the need to requery the SCP 215 when error conditions are detected by the SSPs 240, 245, 250 and 255 from an IP 220, 225, 230 and 235. Each of the SSPs 240, 245, 250 and 255 contain instructions and a remote IP routing table located within each respective memory. The remote IP routing table and instructions allow the SSPs 240, 245, 250 and 255 to independently route to necessary IPs.

For example, in FIG. 1, if service provider 165 wants to communicate with private LAN 160, upon receiving a request from the SCP 215, the SSPs 240, 245, 250 and 255 of FIG. 2 can access an IP routing table contained within each of their respective memories. If, for example, an originating SSP 240 detects an error condition from local IP 220, based on the error condition, the originating SSP 240 can use the second route listed in its remote IP routing table. This second route can be to a remote switch 245 in an attempt to access remote IP 225 or to remote SSP 250 in an attempt to access remote IP 230, or through any other communication path. For the sake of illustration, if the second route consisting of remote SSP 245 and remote IP 225 results in a successful route, the service provider 165 can be connected to private LAN 160 of FIG. 1 by sending information through originating switch 240 and remote switch 245.

Figure 3:
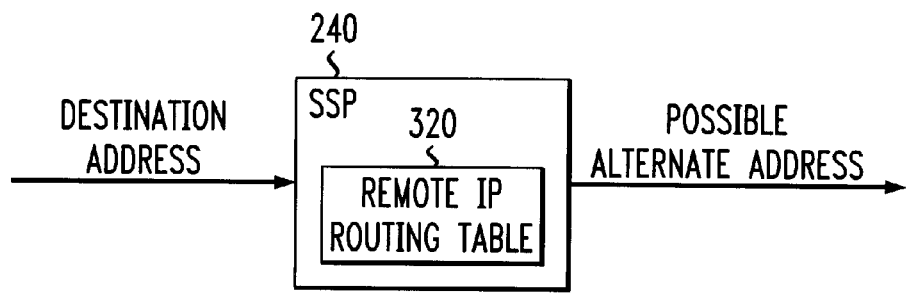
FIG. 3 illustrates an exemplary block diagram for one of the SSPs shown in FIG. 2.

FIG. 3 shows an exemplary block diagram for one of the SSPs in FIG. 2, SSP 240. The SSP 240 of FIG. 3 receives the destination address content from the SCP 215 of FIG. 2 which allows SSP 240 to access a remote IP routing table 320 contained within its memory. Each SSP 240, 245, 250 and 255 of FIG. 2 includes a remote IP routing table 320 within its memory containing instructions for routing to another IP 220, 225, 230 and 235. Such instructions can enable any of the SSPs 240, 245, 250 and 255 to route a connection to a successive IP 220, 225, 230 and 235 should the initial launch to a local IP fail. For example, if originating SSP 240's local IP 220 reports an error condition, the originating SSP 240 can launch a connection to remote IP 225 via remote SSP 245. If the initial launch to the local IP 220 fails, the originating switch 240 can launch a connection to a subsequent IP 225, 230 or 235, without another query to the SCP 215. The remote IP routing table 320 also allows the originating SSP 240 to route a connection to a successive IP 225, 230 and 235 if the local IP 220, although operative, cannot process the request.

Figure 4:
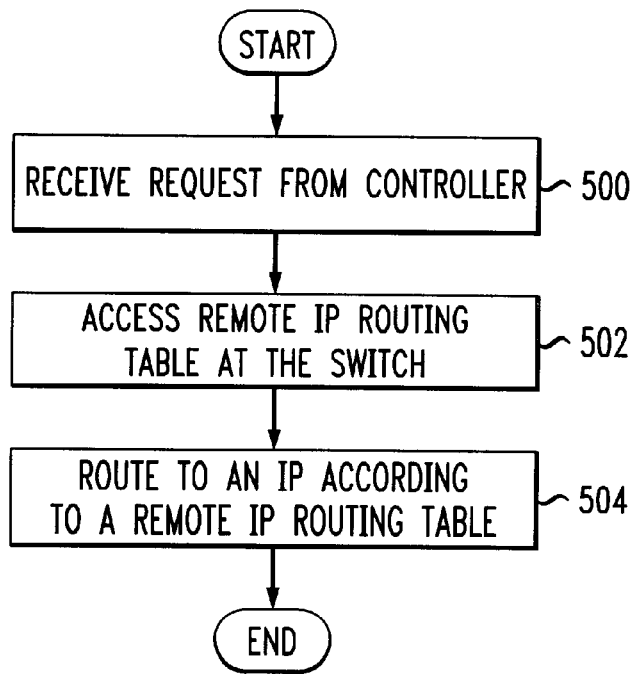
FIG. 4 shows a flowchart of steps of a method for remote IP routing.

FIG. 4 is an exemplary flowchart of steps of a method for remote IP routing. In step 500, an originating SSP (or switch) 240 receives a request from the SCP (or controller) 215. The request from the SCP 240 includes a destination address. The request for communication services can vary in form and content based on the type of communication system or systems used to provide the communication services. For example, a request for communication services in a telephone network could include a destination address of a communication device, such as a numeric character string designating a particular computer linked to the network.

In step 502, the originating switch accesses a remote IP routing table 320 within the originating SSP 240 of FIG. 2. During this step, a route is determined based on a destination address received from the SCP 215 of FIG. 2. The route is determined irrespective of the identity of the calling party. The route can be determined in various different ways depending on the type of communication system used to provide the communication services. For example, an SSP in a telecommunications network could simply access a single set of routing information stored in the SSP and route a call based on the retrieved routing information. In this case, the routing information, along with alternative routing information, is all contained within the originating SSP 240. The originating SSP 240 can route to a remote IP 225, 230 or 235 of FIG. 2 without the need to be updated by an outside source if an error is associated with one of the IPs.

In step 504, the originating SSP 240 routes to a remote IP 225, 230 or 235 according to instructions in the remote IP routing table 320. The requested communication services are provided using the routing established in step 502. The communication services are typically two-way communication services between a caller and a called party that are located in geographically separated locations. The communication services can also be related to speech services including playing announcements and collecting digits from a calling/called party.

Figure 5:
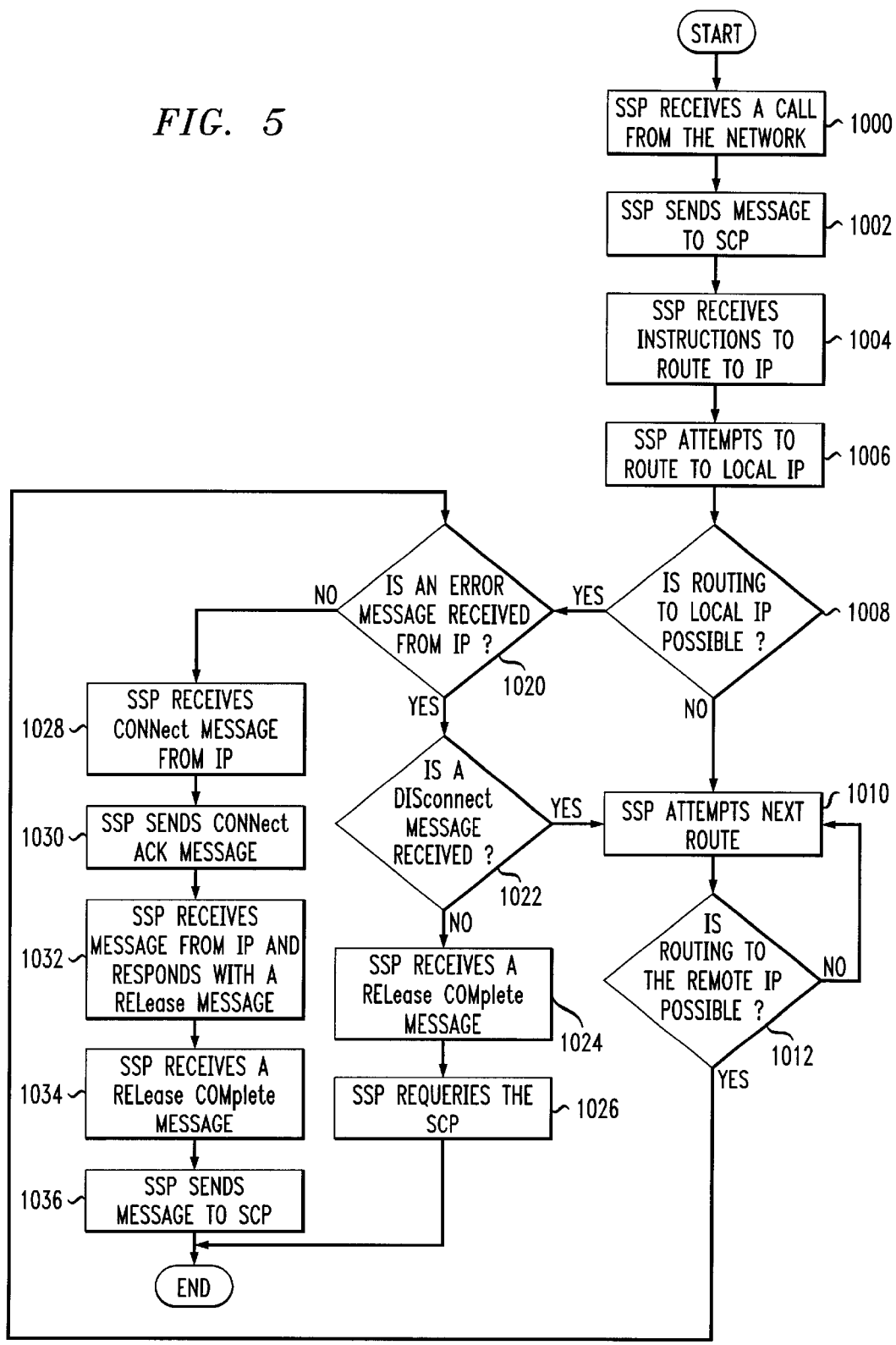
FIG. 5 shows a flowchart of an exemplary process of the SSP of the remote IP routing system.

FIG. 5 is an exemplary flowchart for a process of the remote IP routing device 120 in the network 110. In step 1000, the originating SSP 240 of FIG. 2 receives a call from the network 110 of FIG. 1. A trigger is activated. Based on the trigger, the originating SSP 240 populates and inserts an Info_Analyzed or Info_Collected operation into a message. The message is sent to the SCP 215 in step 1002. The SCP 215 receives the message from the originating SSP 240 and determines which service is appropriate for the call. The SCP 215 populates a Send_To_Resource operation in another message and sends it to the originating SSP 240 in step 1004. Contained in this operation or residing on the originating SSP 240 is a remote IP routing table 320 with several possible routes.

At step 1006 the originating SSP 240 attempts to connect to a local IP 220 route. The originating SSP 240 determines whether routing to a local IP 220 is possible in step 1008. If routing to the local IP 220 is not possible, the originating SSP 240 attempts the next route found in the IP routing table 320 at step 1010.

In the above example, the first route can be to a local IP 220. When the originating SSP 240 attempts to use the local IP 220 route and it fails, the originating SSP 240 would automatically access the second route in the remote IP access table 320 without requerying the SCP 215. If the second route fails, the originating SSP 240 would try the third route, and so on. However, if routing to either the local IP 220, the first remote IP 225, the second remote IP 230, and so on, is possible, the process goes to step 1020.

At step 1020, the originating SSP 240 checks for an error message from the particular IP 220, 225, 230 and 235 to which the SSP 240 has routed the request. If an error message is received by the originating SSP 240 from an IP 220, for example, the originating SSP 240 checks to see if the error message is a DISConnect message at step 1022. Here the originating SSP 240 has actually routed the request to the IP 220; however, the IP 220 is reporting that it cannot perform the desired operation or that it started the operation and then experienced a failure. The IP 220 has a choice of the DISConnect or RELease COMplete message that it can use to reply to the originating SSP 240.

The IP 220 may be programmed to return a DISConnect message with abnormal return code if an error occurs but the IP should still be used. An example of this type of error is the IP 220 has no resources to process the request. If the error message received from the IP 220 is a DISConnect message, the originating SSP 240 goes back to step 1010 and will access the remote IP routing table 320 at the second entry, to find a remote route. The originating SSP 240 goes down the list of remote IP 225, 230, and 235 routes, for example, from step 1010 to step 1018, until a route is possible.

If the error message received from the originating SSP 240 is not a DISConnect message, then the process goes to step 1024 where the originating SSP 240 determines whether it has received a RELease COMplete message. This type of error is identified by the IP 220 returning a RELease COMplete message to the originating SSP 240 with an abnormal return code. Examples of this type of error are hardware failure in the middle of interacting with a network user or the message is corrupted. This error does not result in using a remote IP 225, 230, and 235. After the originating SSP 240 receives the RELease COMplete message, the originating SSP 240 requeries the SCP 215 at step 1026 and the process ends.

At step 1020, if the originating SCP 215 does not receive an error message from the IP 220, the originating SSP 240 goes to step 1028 where it receives a CONNect message from the IP 220. Then, at step 1030, the originating SSP 240 sends a CONNect ACK message back to the IP 220. The SSP 240 then goes through a series of steps 1030, 1032, 1034 and 1036, whereby the originating SSP 240 receives message from IP 220 and responds with a RELease message after completing iterations with the IP 220, receives a RELease COMplete message from the IP 220, and then the originating SSP 240 sends a message to the SCP 215 where the process ends.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method of routing to an intelligent peripheral device, comprising:

storing routing information in a routing table at a service switching point for routing to an intelligent peripheral device, said routing table having a listing of intelligent peripheral devices, each of said intelligent peripheral devices having an assigned alternate intelligent peripheral device;

generating a routing request at a service control point for routing a call to a first intelligent peripheral device;

receiving the routing request at the service switching point from the service control point, the routing request including a destination address for the first peripheral device;

accessing the routing table and retrieving routing information at a service switching point for routing the call to the first peripheral device based on the destination address received from the service control point;

initially routing the call to the first intelligent peripheral device;

receiving an error condition from the first intelligent peripheral;

determining at the service switching point whether to clear the call or route the call to the alternate intelligent peripheral device;

in the event that the service switching point elects to route the call to the alternate intelligent peripheral device, accessing the routing table at the service switch point and retrieving routing information for routing the call to the alternate intelligent peripheral device; and routing the call at the service switch point to the alternate intelligent peripheral device.

2. The method of claim 1, further comprising the step of determining whether the destination address generated by the service control point is assigned to a local intelligent peripheral device connected to the service switching point, and if so, connecting the call to the local intelligent peripheral device.

3. The method of claim 1, wherein the call to the first and alternate intelligent peripheral devices is routed irrespective of the identity of the calling party.

4. The method of claim 1, wherein the storing step includes associating a plurality of alternate intelligent peripheral devices to the first intelligent peripheral device.

5. The method of claim 4, wherein the step of associating includes sequentially listing the plurality of alternate intelligent peripheral devices.

6. The method of claim 5, further comprising the step of sequentially routing the call to each of the alternate peripheral devices until the call is completed.

7. The method of claim 1 further comprising the step of playing an announcement after the call is completed at the alternate intelligent peripheral device.

8. The method of claim 7 further comprising the step of collecting digits from a calling party.

9. The method of claim 1 wherein the step of generating a routing request includes determining a service provided by the first intelligent peripheral device.

10. An intelligent peripheral routing system in a communications network, comprising:

a service control point for generating a routing request for routing a call to a first intelligent peripheral device; and a service switching point having a routing table for storing routing information, said routing table having a listing of intelligent peripheral devices, each of said intelligent peripheral devices having an assigned alternate intelligent peripheral device and adapted for receiving the routing request from the service control point, the routing request including a destination address for the first intelligent peripheral device, and for accessing the routing table and for routing the call to the first intelligent peripheral device based on the destination address received from the service control point, the service switching point being operable for initially routing the call to the first intelligent peripheral device and for receiving an error condition from the first intelligent peripheral device, the service switching point being adapted to be responsive to the error condition and being operable for determining whether to clear the call or route the call to the alternative intelligent peripheral device, in the event that the service switching point elects to route the call to the alternate intelligent peripheral device, the service switching point being operable for accessing the routing table and for retrieving routing information and for routing the call to the alternate intelligent peripheral device.

11. The method of claim 1, further comprising the step of sending a routing query to the service control point for routing the call.

12. The system of claim 10 wherein the service switching point is adapted for determining whether the destination address generated by the service control point is assigned to a local intelligent peripheral device connected to the service switching point and if so connecting the call to the local intelligent peripheral device.

13. The system of claim 10, wherein the service switching point is adapted to route the call to the first and alternate intelligent peripheral devices irrespective of the identity of the calling party.

14. The system of claim 10, wherein the routing table includes a list of a plurality of alternate intelligent peripheral devices associated with the first alternate intelligent peripheral device.

15. The system of claim 14, wherein the list includes a sequential routing list of the plurality of alternate intelligent peripheral devices.

16. The system of claim 15, wherein the service switching point is adapted for routing a call in accordance with the sequential routing list after receiving the error condition from the first alternate intelligent peripheral device.

17. The system of claim 10, further comprising a means for announcing a message at the alternate peripheral device, after the call is completed.

* * * * *